United States Patent
Bharadwaj et al.

(10) Patent No.: US 10,194,436 B2
(45) Date of Patent: Jan. 29, 2019

(54) WI-FI FRAMES INCLUDING FRAME EXTENSIONS

(71) Applicant: QUALCOMM Incorporated, San Diego, CA (US)

(72) Inventors: Arjun Bharadwaj, San Diego, CA (US); Bin Tian, San Diego, CA (US); Sameer Vermani, San Diego, CA (US); Youhan Kim, San Jose, CA (US); Vishvabhusan Pati, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 15/088,113

(22) Filed: Apr. 1, 2016

(65) Prior Publication Data
US 2016/0302199 A1 Oct. 13, 2016

Related U.S. Application Data

(60) Provisional application No. 62/152,008, filed on Apr. 23, 2015, provisional application No. 62/151,399, (Continued)

(51) Int. Cl.
*H04W 72/04* (2009.01)
*H04L 1/00* (2006.01)
(Continued)

(52) U.S. Cl.
CPC ....... *H04W 72/0446* (2013.01); *H04L 1/0005* (2013.01); *H04L 1/0008* (2013.01);
(Continued)

(58) Field of Classification Search
None
See application file for complete search history.

(56) References Cited

U.S. PATENT DOCUMENTS

| 7,239,648 B1 | 7/2007 | Feng et al. |
| 2006/0036923 A1 | 2/2006 | Hedberg et al. |

(Continued)

FOREIGN PATENT DOCUMENTS

| JP | 2008270863 A | 11/2008 |
| JP | 2008271312 A | 11/2008 |

OTHER PUBLICATIONS

International Search Report and Written Opinion—PCT/US2016/025782—ISA/EPO—dated Jul. 8, 2016.
(Continued)

*Primary Examiner* — Chi H Pham
*Assistant Examiner* — Vladislav Y Agureyev
(74) *Attorney, Agent, or Firm* — Patterson & Sheridan, L.L.P.

(57) ABSTRACT

Certain aspects of the present disclosure generally relate to wireless communications and, more particularly, to Wi-Fi systems including frame extensions in transmission frames. Lengths of frame extensions may be determined based on transmission bandwidths and transmission data rates of the frames. Lengths of frame extensions may also be determined based on an amount of useful data in a final symbol of the frame. An access point (AP) may determine frame extension lengths for use in transmitting to stations (STAs) based on reception capabilities of the STAs. An AP may determine frame extension lengths for STAs to use in transmitting frames.

27 Claims, 13 Drawing Sheets

Related U.S. Application Data filed on Apr. 22, 2015, provisional application No. 62/144,216, filed on Apr. 7, 2015.

(51) Int. Cl.

| | | |
|---|---|---|
| *H04L 1/16* | (2006.01) | |
| *H04W 84/12* | (2009.01) | |
| *H04L 5/00* | (2006.01) | |
| *H04B 7/0452* | (2017.01) | |

(52) U.S. Cl.
CPC .......... *H04L 1/0011* (2013.01); *H04L 1/0042* (2013.01); *H04L 1/1685* (2013.01); *H04L 5/0044* (2013.01); *H04W 84/12* (2013.01); *H04B 7/0452* (2013.01)

(56) References Cited

U.S. PATENT DOCUMENTS

| | | | |
|---|---|---|---|
| 2010/0226315 A1 | 9/2010 | Das et al. | |
| 2011/0216758 A1 | 9/2011 | Hoshihara et al. | |
| 2011/0261742 A1 | 10/2011 | Wentink | |
| 2012/0218947 A1* | 8/2012 | Merlin | H04L 25/03343 370/329 |
| 2013/0073927 A1 | 3/2013 | Kasher | |
| 2013/0121244 A1* | 5/2013 | Vermani | H04L 1/0029 370/328 |
| 2013/0177096 A1 | 7/2013 | Park et al. | |
| 2013/0301551 A1 | 11/2013 | Ghosh et al. | |
| 2015/0146653 A1* | 5/2015 | Zhang | H04L 5/0041 370/329 |
| 2015/0349995 A1* | 12/2015 | Zhang | H04L 5/0048 375/295 |
| 2016/0302104 A1 | 10/2016 | Bharadwaj et al. | |

OTHER PUBLICATIONS

Zhang H., "HE PHY Padding and Packet Extension; 11-15-0810-01-00ax-he-phy-padding-and-packet-extension," IEEE Draft; 11-15-0810-01-00AX-HE-PHY-Padding-and-Packet-Extension, IEEE-SA Mentor, Piscataway, NJ USA, vol. 802.11ax, No. 1, Sep. 14, 2015 (Sep. 14, 2015), pp. 1-46, XP068098035 [ retrieved on Sep. 14, 2015] slides 12 to 18.

Lee I., et al., "A Modified Medium Access Control Algorithm for Systems with Iterative Decoding", IEEE Transactions on Wireless Communications, XP055308687, Feb. 2, 2006, vol. 5, No. 2, pp. 270-273. DOI: 10.11 09/TWC.2006.02003, Retrieved from the Internet: URL: http://ieeexplore.ieee.org/ielx5/7693/33835/01611 047.pdftp=&arnumber=1611047&isnumber=33835.

\* cited by examiner

WI-FI FRAMES INCLUDING FRAME EXTENSIONS

CROSS-REFERENCE TO RELATED APPLICATIONS

The present Application for Patent claims priority to U.S. Provisional Application No. 62/151,399, filed Apr. 22, 2015, U.S. Provisional Application No. 62/152,008, filed Apr. 23, 2015, and U.S. Provisional Application No. 62/144,216, filed Apr. 7, 2015, all of which are assigned to the assignee of the present application and hereby expressly incorporated by reference herein in their entireties.

BACKGROUND

Field of the Disclosure

Certain aspects of the present disclosure generally relate to wireless communications and, more particularly, to Wi-Fi systems including frame extensions in transmission frames.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater data throughput, various techniques are being developed. For example, in the IEEE 802.11 ax Wi-Fi standard, a larger number of tones are processed and decoded, as compared to earlier Wi-Fi standards, e.g., IEEE 802.11 ac. The larger number of tones allows more data to be transmitted in the same bandwidth and time period.

Processing of signals with a larger number of tones may result in receivers performing additional processing to receive data frames (e.g., packet layer convergence protocol (PLCP) protocol data units (PPDUs)) than in standards using smaller numbers of tones. The additional processing may cause the receivers to take more time to process and decode the data frames. There is therefore a need for improvements to wireless communications to accommodate the time consumed by devices processing received data frames.

SUMMARY

Certain aspects of the present disclosure provide an apparatus for wireless communications. The apparatus generally includes a processing system configured to generate a frame for transmitting data to one or more devices, to decide determine whether to include a frame extension after a last data symbol in the frame, and to provide an indication of a length of the frame extension, and a first interface configured to output the frame for transmission.

Certain aspects of the present disclosure provide an apparatus for wireless communications. The apparatus generally includes a processing system configured to generate a frame to trigger transmission of a data frame from each of one or more devices, to determine a length of a frame extension to be included after a last data symbol in each data frame, and to provide an indication of a length of the frame extension, and a first interface configured to output the frame for transmission.

Certain aspects of the present disclosure provide an apparatus for wireless communications. The apparatus typically includes an interface configured to obtain a data frame having a frame extension after a last data symbol in the frame and to obtain an indication of a length of the frame extension, and a processing system configured to process portions of the data frame prior to the frame extension based on the indicated length.

Certain aspects of the present disclosure provide an apparatus for wireless communications. The apparatus typically includes a first interface configured to obtain a frame and to obtain an indication of a length of a frame extension to be included after a last data symbol in a data frame transmitted in response to the frame, a processing system configured to generate the data frame including the frame extension of the indicated length, and a second interface configured to output the data frame for transmission.

Certain aspects also provide various methods, apparatuses, and computer program products capable of performing operations corresponding to those described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
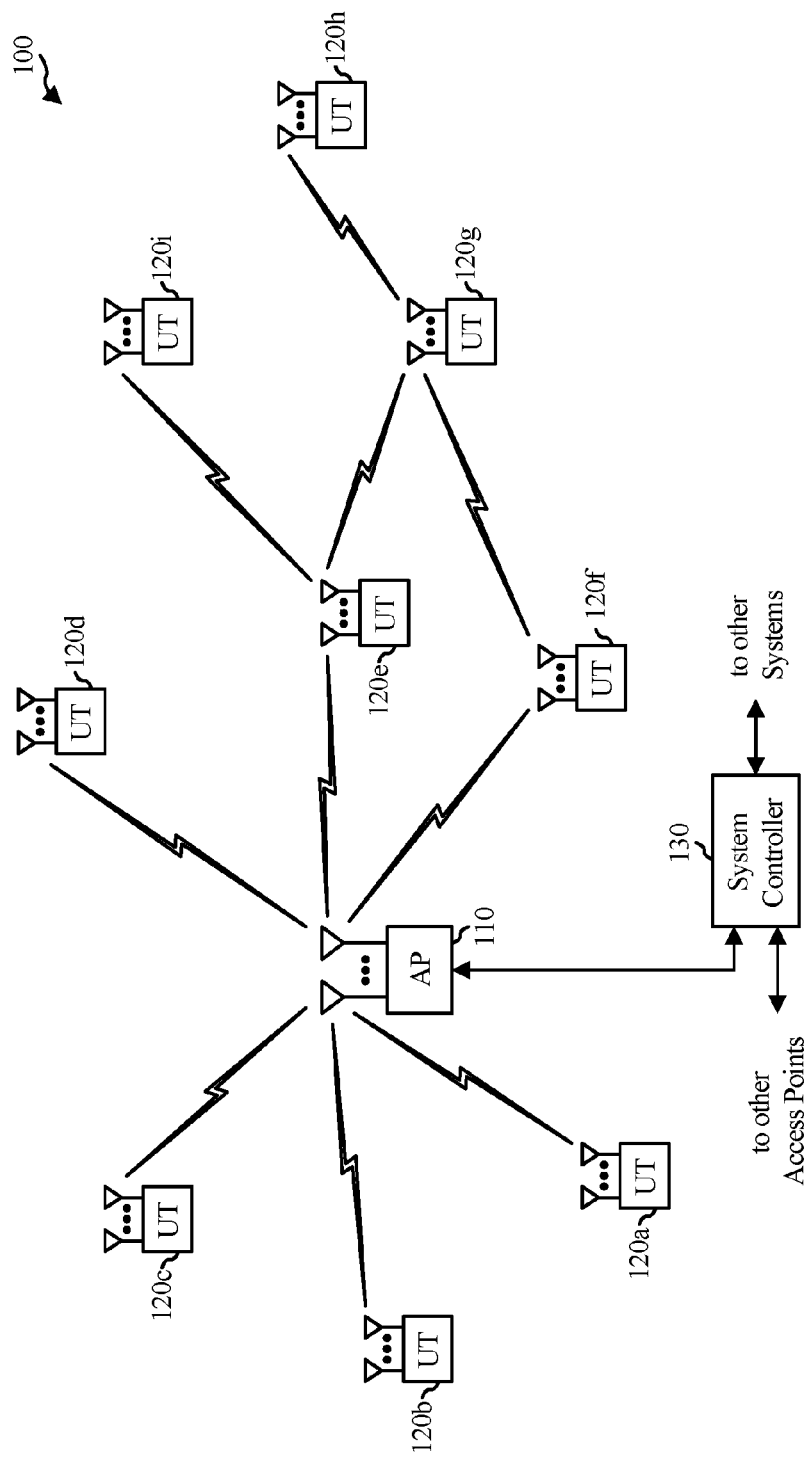
FIG. 1 illustrates a diagram of an example wireless communications network, in accordance with certain aspects of the present disclosure.

Aspects of the present disclosure provide improved techniques for processing time extension for high bandwidth wireless communications. The described enhancements to signaling may, for example, allow an access point (AP) to extend the length of a transmitted data frame beyond the end of useful data to allow stations (STAs) receiving the data frame more time to process the data frame. In aspects of the present disclosure, an AP may indicate the length of a frame extension used in transmitting a data frame. A STA may receive the data frame, obtain the indication of the frame extension length, determine the frame extension length, and process portions of the data frame prior to the frame extension.

Aspects of the present disclosure provide enhancements to signaling that allow an AP to determine a length of a frame extension to be included in a frame to be transmitted by STAs, provide an indication of the length to the STAs, and transmit a frame to cause the STAs to transmit data frames including frame extensions of the determined length. A STA may receive the frame, obtain the indication of the frame extension length, determine the frame extension length, and transmit a data frame including a frame extension of the determined length.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced. For example, one or more user terminals 120 may signal capabilities (e.g., to access point 110) using the techniques provided herein.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, a station, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
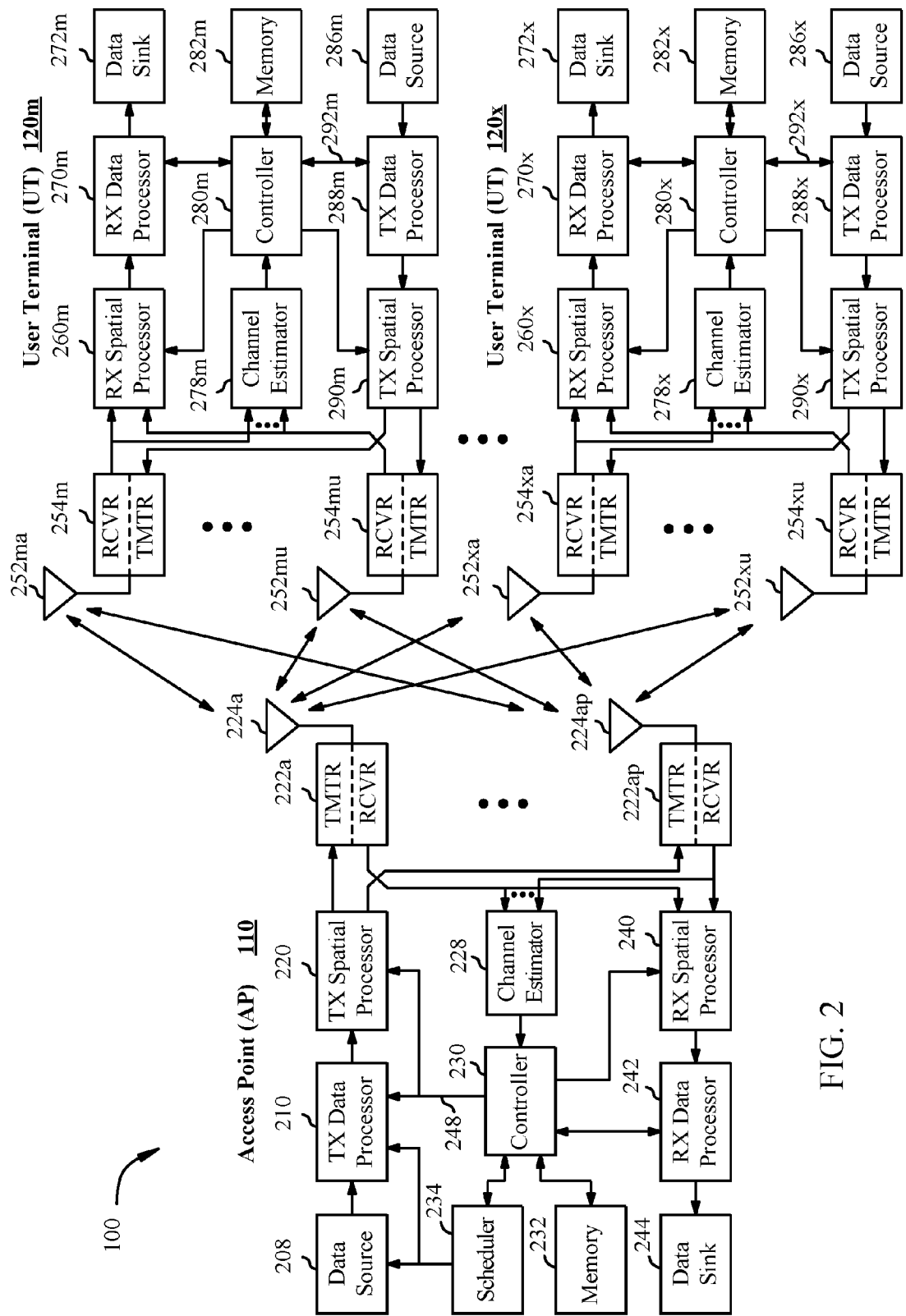
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100 (which may be examples of the access point 110 and user terminals 120 described above with reference to FIG. 1—and capable of performing the techniques described herein). The various processors shown in FIG. 2 may be configured to perform (or direct a device to perform) various methods described herein, for example, the operations 400 and 500 described in association with FIGS. 4 and 5.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280 via an interface 292. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 via an interface 248, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
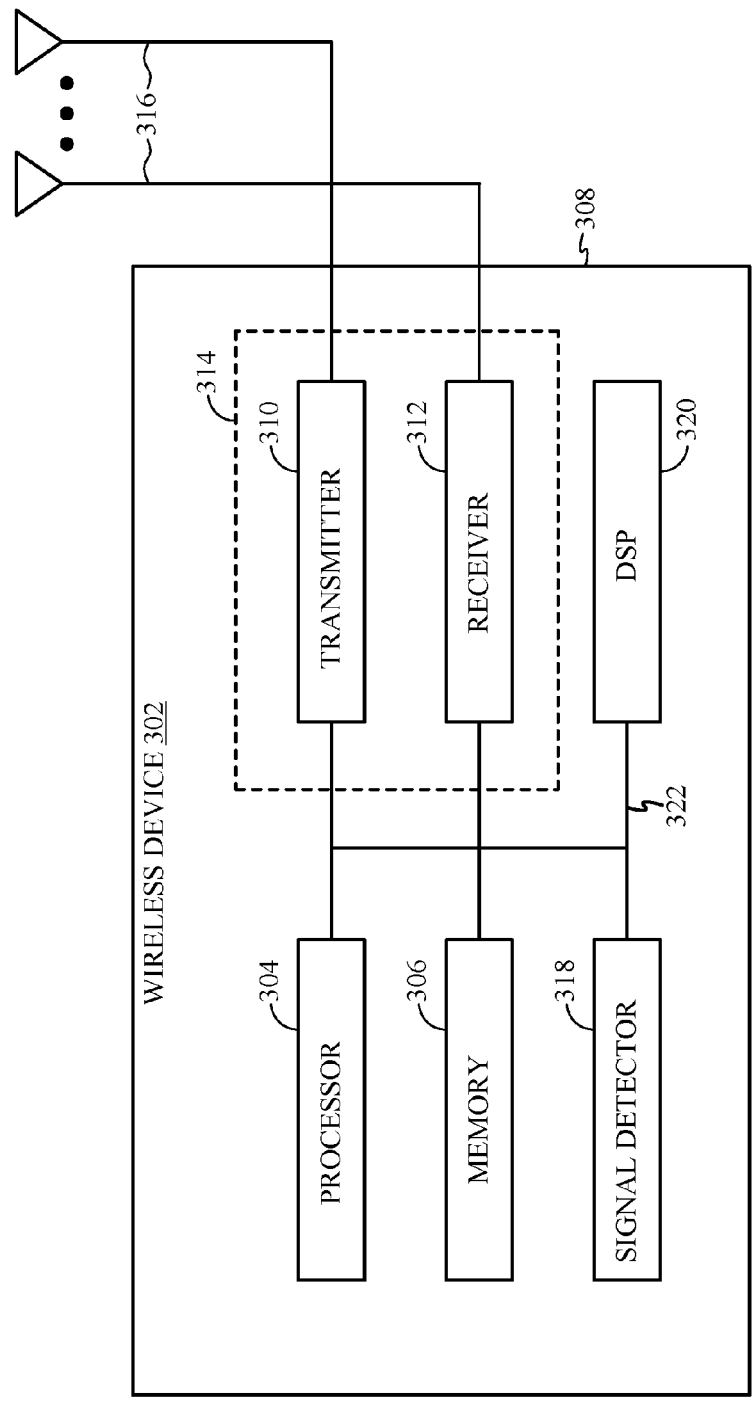
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein, for example, the operations 400 and 500 described in association with FIGS. 4 and 5. The wireless device 302 may be an access point 110 or a user terminal 120.

The wireless device 302 may include a processor 304 which controls operation of the wireless device 302. The processor 304 may also be referred to as a central processing unit (CPU). The processor 304 may control the wireless device 302 in executing the various methods described herein, for example, the operations 400 and 500 described in association with FIGS. 4 and 5. Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein, for example, the operations 400 and 500 described in association with FIGS. 4 and 5.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single transmit antenna or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In general, an AP and STA may perform similar (e.g., symmetric or complementary) operations. Therefore, for many of the techniques described herein, an AP or STA may perform similar operations. To that end, the following description will sometimes refer to an "AP/STA" to reflect that an operation may be performed by either. Although, it should be understood that even if only "AP" or "STA" is used, it does not mean a corresponding operation or mechanism is limited to that type of device.

Example Frame Extension

In the proposed IEEE 802.11ax wireless communications standard, the number of tones to be processed (e.g., decoded) in a received signal is four times the number of tones used in the IEEE 802.11ac standard. The short interframe space (SIFS) in IEEE 802.11 ax is unchanged from previous versions of the standard in order to remain compatible with legacy devices. However, receivers may need more time than the length of a SIFS to process an IEEE 802.11ax frame (e.g., a packet layer convergence protocol (PLCP) protocol data unit (PPDU)), due to the large number of tones the frame can use and large amount of data the frame can convey. According to aspects of the present disclosure, a frame extension (e.g., a packet extension) may be included at the end of an IEEE 802.11ax frame to give receivers time to complete processing of the frame before the end of the SIFS that begins at the end of the frame. The frame extension is a waveform added to the end of the frame that allows receivers more time to complete processing of the frame.

According to aspects of the present disclosure, frame extensions are not used with every IEEE 802.11ax frame. Receivers receiving frames transmitted with bandwidths less than or equal to a threshold bandwidth may be capable of processing the frames within a SIFS. Most current receivers compatible with the IEEE 802.11ac standard are capable of processing IEEE 802.11ac frames transmitted using a 160

MHz bandwidth within a SIFS. These receivers may be able to complete processing of an IEEE 802.11ax frame (with four times as many tones as an IEEE 802.11ac frame) transmitted using a forty MHz bandwidth (one-fourth of 160 MHz) within a SIFS, as the amount of processing is comparable to the amount of processing required to process an IEEE 802.11ac frame in a 160 MHz bandwidth.

According to aspects of the present disclosure, frame extensions are not used for frames transmitted at data rates less than or equal to a threshold data rate. Frames transmitted with low data rates require less processing than frames using high data rates. Receivers receiving frames transmitted with data rates below a threshold data rate may be capable of processing the frames within a SIFS. According to aspects of the present disclosure, a device (e.g., an AP or STA) may determine the threshold data rate based on a reception capability of another apparatus. The apparatus may provide (e.g., by setting a bit in a transmission) an indication of the reception capability of the apparatus. For example, a STA may transmit a value of one in a bit of a capability advertisement, and an AP receiving that capability advertisement may determine to use an infinite data rate threshold when deciding whether to include frame extensions in high data rate high bandwidth frames transmitted to the STA, based on the capability advertisement. In the example, the AP determines not to include frame extensions in frames to the STA, because no data rate is greater than or equal to the infinite data rate threshold. In the example, if a STA transmits a value of zero in the bit of the capability advertisement, the AP may determine to use 12 kilobits per symbol as a data rate threshold. Still in the example, the AP may determine to include frame extensions in frames transmitted to the STA at data rates greater than or equal to the 12 kilobits per symbol data rate threshold.

According to aspects of the present disclosure, a device (e.g., an AP or STA) may determine threshold data rates for each of a plurality of packet extension modes. Packet extension modes for a device may comprise operational modes wherein packet extensions of up to a maximum length may be requested by a device when the device is receiving frames. For example, a STA may operate using two packet extension modes, an eight μsec mode and a sixteen μsec mode. In the example, the STA may determine first threshold data rates for requesting packet extensions of up to eight μsec (e.g., zero μsec, four μsec, or eight μsec) and second threshold data rates for requesting packet extensions of up to sixteen μsec (e.g., four μsec, eight μsec, twelve μsec, or sixteen μsec).

According to aspects of the present disclosure, a device (e.g., an AP or STA) may determine the threshold data rate for determining to include a frame extension in a frame transmitted to another apparatus based on at least one of a transmission bandwidth or a number of spatial streams ($N_{ss}$) to be transmitted in the frame. The apparatus may provide (e.g., by transmitting to the device) a table indicating different threshold values for different combinations of transmission bandwidths and numbers of spatial streams.

According to aspects of the present disclosure, a device (e.g., a STA or an AP) may determine a threshold encoding constellation for a given transmission bandwidth and number of spatial streams ($N_{ss}$) based on a threshold data rate for the device. The device may provide a table of threshold encodings for the given transmission bandwidth and $N_{ss}$, in addition to or instead of providing a table of threshold data rate values.

According to aspects of the present disclosure, a first device may provide an indication of a constellation level threshold by transmitting certain bits (e.g., three bits) in a capabilities advertisement. A second device obtaining the bits may refer to a table of constellation levels to determine the constellation level threshold indicated by the first device. An exemplary table of constellations and threshold encodings in a high efficiency (HE) capabilities field is shown below:

| Constellation | Threshold Encoding in HE Capability |
|---|---|
| BPSK | 000 |
| QPSK | 001 |
| 16 QAM | 010 |
| 64 QAM | 011 |
| 256 QAM | 100 |
| 1024 QAM | 101 |
| None | 111 |

According to aspects of the present disclosure, a device may provide two constellation level thresholds for a given combination of transmission bandwidth and $N_{ss}$, with a first constellation threshold for use in determining if packet extension is requested for a first packet extension mode (e.g., an eight μsec mode) and a second constellation threshold for use in determining if packet extension is requested for a second packet extension mode (e.g., a sixteen μsec mode).

According to aspects of the present disclosure, a first device receiving an indication of a constellation threshold for a given transmission bandwidth and $N_{ss}$ from a second device may determine the indicated constellation threshold (e.g., by consulting a table), determine if an encoding constellation to use in transmitting to the first device on the given transmission bandwidth and with the given $N_{ss}$ exceeds the indicated constellation threshold, and, if the encoding constellation to use exceeds the indicated constellation threshold, transmit a frame using packet extension to the second device.

According to aspects of the present disclosure, frame extensions are not used for frames transmitted using modulation and coding schemes (MCS) lower than or equal to a threshold MCS. Frames transmitted with lower MCS require less processing than frames using high MCS. Receivers receiving frames transmitted with MCS below a threshold MCS may be capable of processing the frames within a SIFS. According to aspects of the present disclosure, a device (e.g., an AP or STA) may determine the threshold MCS based on at least one of the transmission bandwidth or a number of spatial streams to be transmitted in the frame.

According to aspects of the present disclosure, a device (e.g., an AP or STA) may determine the threshold MCS based on a reception capability of another apparatus. The apparatus may provide (e.g., by transmitting to the device) a table or tables indicating different MCS thresholds for different combinations of transmission bandwidths and numbers of spatial streams. For example, a STA may transmit the table below to an AP transmitting frames (e.g., PPDUs) using an 80 MHz bandwidth:

| $N_{ss}$ | MCS Threshold | Notes |
|---|---|---|
| 1 | MCS7 | Choice of MCS threshold is based on |
| 2 | MCS3 | specific device implementations for fast |
| 3 | MCS1 | Fourier transform (FFT) and low density |
| 4 | MCS0 | parity check (LDPC) decoding |

In the example, an AP receiving the table above may determine to use MCS5 when transmitting a data frame in two spatial streams ($N_{ss}=2$) to the STA. In the example, the AP determines to include a frame extension in the data frame to the STA, because MCS5 used for transmitting the data frame is higher than the MCS threshold of MCS3 determined from the table.

According to aspects of the present disclosure, a device (e.g., an AP or STA) may determine the size of a frame extension to include with a frame based on a fraction of useful bits in the final symbol of the frame. In Wi-Fi communications, each symbol of a transmission conveys a number of bits of information, depending on the modulation and coding scheme (MCS) selected to transmit the frame. If the number of bits of information (e.g., useful bits) to be transmitted in a frame is not an integral multiple of the number of bits of data conveyed by a symbol transmitted using the selected MCS, then padding bits are added to the useful bits to make the number of bits transmitted in the frame equal to an integral multiple of the number of bits of data conveyed by a symbol transmitted using the selected MCS. That is, padding bits are added to the useful bits so that the final symbol of the frame has a same number of data bits as the other symbols of the frame. By doing so, the frame may comprise an integral number of symbols to be transmitted. According to aspects of the present disclosure, the length of a frame extension is determined based on a fraction of useful bits in the final symbol of the frame. This may allow the receiver of the frame additional time to decode useful bits in the final symbol of the frame without taking additional time to decode other (e.g. padding) bits in the final symbol of the frame.

According to aspects of the present disclosure, a fraction $\alpha$ of useful bits in a final symbol of a frame may be calculated by the equation below:

$$\alpha = N_{cbps\_u}/N_{cbps}, \text{ where}$$

$N_{cbps\_u}$ is the number of useful coded bits in the last symbol, and $N_{cbps}$ is the total number of coded bits in a symbol transmitted in the frame.

According to aspects of the present disclosure, the fraction $\alpha$ may be quantized (e.g., by rounding up to the next value) to one of a set of values. A one-to-one mapping of quantized values to frame extension lengths may be determined, according to aspects of the present disclosure. A device transmitting a frame including a frame extension may determine the length of the frame extension based on the quantized value of $\alpha$. The device may provide (e.g., by setting bits to a value in the frame) an indication of the length of the frame extension. In an example, the device may transmit an indication of the length of the frame extension in a signal field (e.g., an HE-SIGB field) of the frame. An apparatus receiving the frame may determine the length of the frame extension based on the provided indication.

In an exemplary embodiment of the present disclosure, a one-to-one mapping of quantized values of $\alpha$ to frame extension lengths and bits (e.g., bits transmitted in a frame that includes the frame extension) indicating the frame extension length is shown in the table below:

| $\alpha$ | Frame Extension | Bits indicating the frame extension length |
|---|---|---|
| 0.25 | 4 μsec | 00 |
| 0.5 | 8 μsec | 01 |
| 0.75 | 12 μsec | 10 |
| 1 | 16 μsec | 11 |

According to some aspects of the present disclosure, the value of $\alpha$ may not be quantized and may instead be used as calculated. According to these aspects, a table may be used to determine a frame extension length and bits indicating the frame extension length to use for various values of $\alpha$. An exemplary table is shown below:

| Criteria | Frame Extension | Bits indicating the frame extension length |
|---|---|---|
| $0 \leq \alpha \leq 0.25$ | 4 μsec | 00 |
| $0.25 < \alpha \leq 0.5$ | 8 μsec | 01 |
| $0.5 < \alpha \leq 0.75$ | 12 μsec | 10 |
| $0.75 < \alpha \leq 1$ | 16 μsec | 11 |

According to aspects of the present disclosure, a device (e.g., an AP) receiving a frame from another apparatus (e.g., a STA) may determine a length of a frame extension based on the transmission bandwidth, transmission data rate, and a of the frame. The device may transmit a frame indicating (e.g., by setting bits in a signal field of the frame) the frame extension length to the apparatus. For example, an AP may determine to allocate transmission resources to a STA for the STA transmit an uplink frame to the AP. In the example, the AP may have previously received a request for an allocation from the STA indicating how much data the STA has to transmit and a capabilities advertisement from the STA indicating a bandwidth and transmission data rate capability of the STA. Still in the example, the AP may determine a bandwidth and transmission data rate for the STA to use in transmitting to the AP, a value of $\alpha$ for the transmission by the STA, a frame extension length, and transmit a frame with an indication of the frame extension length to the STA triggering the STA to transmit a frame (e.g., a PPDU) to the AP using a frame extension of the indicated length.

According to aspects of the present disclosure, a device (e.g., an AP) transmitting a multi-user multiple input multiple output (MU-MIMO) frame to a plurality of other apparatuses (e.g., STAs) may determine a length of a frame extension for each of the plurality of the apparatuses, and then transmit a frame including a frame extension of a length equal to a maximum of the frame extension lengths determined for each of the other apparatuses. For example, an AP may determine to transmit a MU-MIMO frame to two STAs. In the example, the AP may determine that the first STA may need a frame extension of 4 μsec to receive and process the MU-MIMO frame, and the AP may determine that the second STA may need a frame extension of 12 μsec to receive and process the MU-MIMO frame. Still in the example, the AP may transmit the MU-MIMO frame with bits set indicating that the MU-MIMO frame uses a frame extension of 12 μsec (e.g., the maximum of 4 and 12) and having a frame extension 12 μsec long.

According to aspects of the present disclosure, a device (e.g., an AP) receiving a MU-MIMO frame from a plurality of other apparatuses (e.g., STAs) may determine a length of a frame extension for each of the plurality of the apparatuses. The device may transmit a frame indicating (e.g., by setting bits in a signal field of the frame) a frame extension length equal to a maximum length of the frame extension lengths determined for each of the other apparatuses. For example, an AP may determine to grant access to two STAs to transmit MU-MIMO frames to the AP during a period of time. In the example, the AP may determine that the AP may need a frame extension of 4 μsec to receive and process the MU-MIMO frame from the first STA, and the AP may determine that the AP may need a frame extension of 8 μsec to receive and process the MU-MIMO frame from the second STA. Still in the example, the AP may transmit a frame to the STAs with bits set indicating that each STA should transmit the MU-MIMO frame using a frame extension of 8 μsec (e.g., the maximum of 4 and 8).

According to aspects of the present disclosure, a device (e.g., an AP or STA) may determine the size of a frame extension to include with a frame based on a required processing time extension $T_{proc\_ext}$ of the intended receiver of the frame and an amount of time $T_{pad}$ available to the receiver during the last symbol of the frame. $T_{proc\_ext}$ may be calculated based on a ratio β of useful bits to the maximum number of coded bits in the final symbol of the frame. β may also be calculated based on the previously defined a and a ratio of coded bits to the maximum number of coded bits in the final symbol of the frame. This may allow the receiver of the frame additional time to decode useful bits in the final symbol of the frame without taking additional time to decode other (e.g. padding) bits in the final symbol of the frame.

According to aspects of the present disclosure, a fraction β of useful bits in a final symbol of a frame may be calculated by the equation below:

$$\beta = N_{cbps\_u}/N_{max\_cbps}, \text{ where}$$

$N_{cbps\_u}$ is the number of useful coded bits in the last symbol, and $N_{max\_cbps}$ is the maximum number of coded bits in a symbol transmitted in the frame assuming the maximum MCS and the maximum bandwidth supported by the receiving device.

Alternatively, according to aspects of the present disclosure, a fraction β of coded bits in a final symbol of a frame may be calculated by the equation below:

$$\beta = \alpha \cdot N_{cbps}/N_{max\_cbps}, \text{ where}$$

α is the fraction of useful bits in a final symbol of a frame (e.g., PPDU)

$N_{cbps}$ is the total number of coded bits per symbol in the current frame, and $N_{max\_cbps}$ is the maximum number of coded bits in a symbol transmitted in the frame assuming the maximum MCS and the maximum bandwidth supported by the receiving device.

The required processing time extension $T_{proc\_ext}$ for the receiver of the frame may be calculated by using the below equation:

$$T_{proc\_ext} = \text{ceiling}(3.2 \cdot \beta) \cdot 4 \text{ μsec (note that the ceiling operation of } x, \text{ceiling}(x) \text{ is the smallest integer greater than or equal to } x).$$

The amount of time available to the receiver during the last symbol $T_{pad}$ may be calculated by using this equation:

$$T_{pad} = 12.8 \cdot (1-\alpha) \text{ μsec}$$

As previously mentioned, $T_{proc\_ext}$ and $T_{pad}$ may be used in calculating the size of a frame extension to be included with a frame by using the below equation:

$$FE = T_{proc\_ext} - T_{pad}, \text{ where}$$

FE is the size of the frame extension.

According to aspects of the present disclosure, a device may use β in determining an indicator value, a-factor, that corresponds to short symbol segment padding boundaries. The indicator value may be calculated using the below equation:

$$a\text{-factor} = \text{ceiling}(3.2 \cdot \beta)$$

According to aspects of the present disclosure, a device may signal the a-factor of a transmission by the device by setting bits of a field in the transmission. The field may be, for example, included in a high-efficiency signal-A (HE-SIG-A) field of a transmission. An exemplary encoding for a-factor is presented in the table below:

| a-factor value | a-factor field encoding |
|---|---|
| 1 | 01 |
| 2 | 10 |
| 3 | 11 |
| 4 | 00 |

According to aspects of the present disclosure, a first device transmitting a frame to a second device may determine a length of a frame extension to use in transmitting the frame to the second device by determining if an encoding constellation to be used in transmitting the frame exceeds a constellation threshold for the transmission bandwidth and number of spatial streams, as previously described. If the encoding constellation exceeds a constellation threshold, then the first device may look up a frame extension length for the frame based on the packet extension mode of the second device and the a-factor of the transmission. An exemplary table of a-factors and corresponding packet extension lengths is below.

| a-factor value | Packet extension length for 8 μsec packet extension mode | Packet extension length for 16 μsec packet extension mode |
|---|---|---|
| 1 | 0 | 4 μsec |
| 2 | 0 | 8 μsec |
| 3 | 4 μsec | 12 μsec |
| 4 | 8 μsec | 16 μsec |

Figure 4:
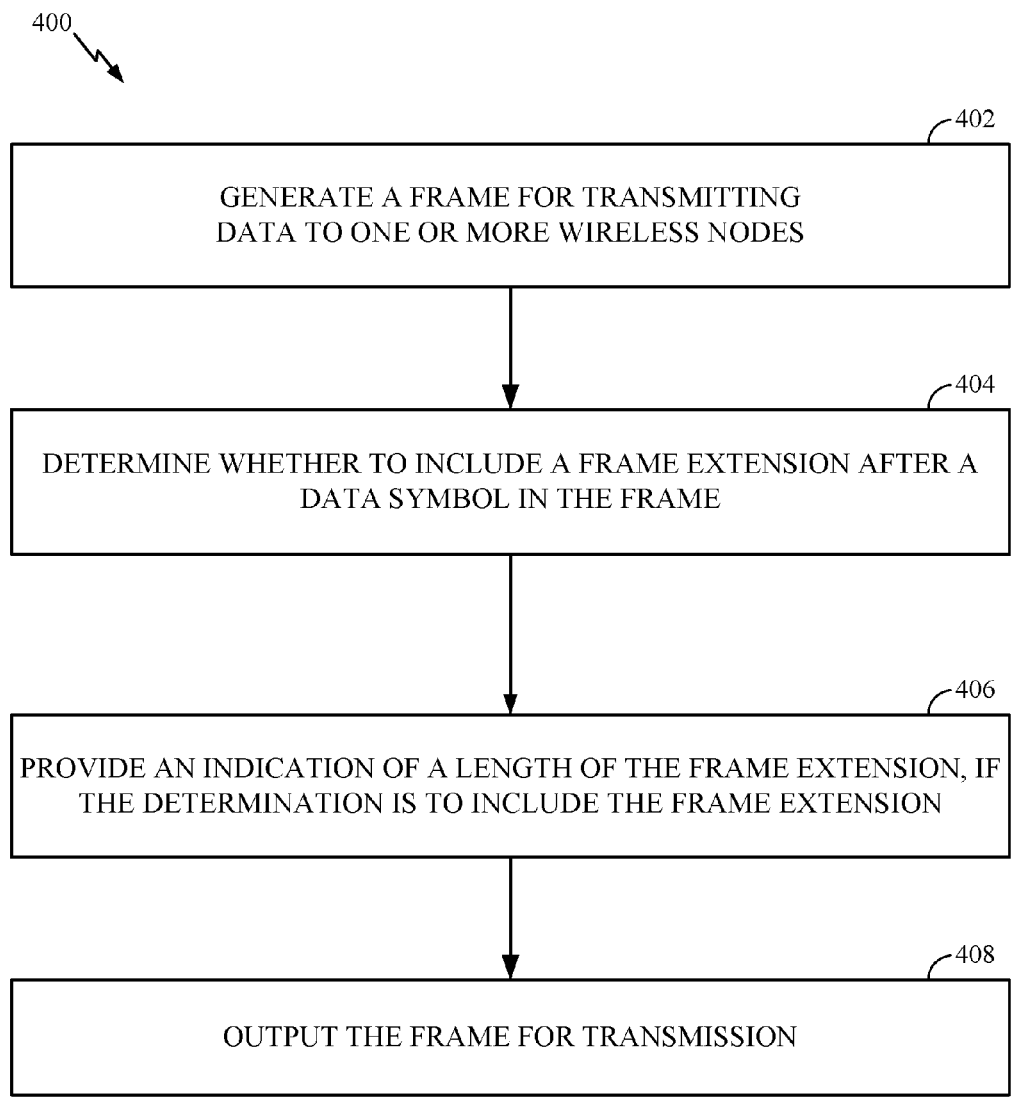
FIG. 4 sets forth example operations for wireless communications, in accordance with certain aspects of the present disclosure.
Figure 4A:
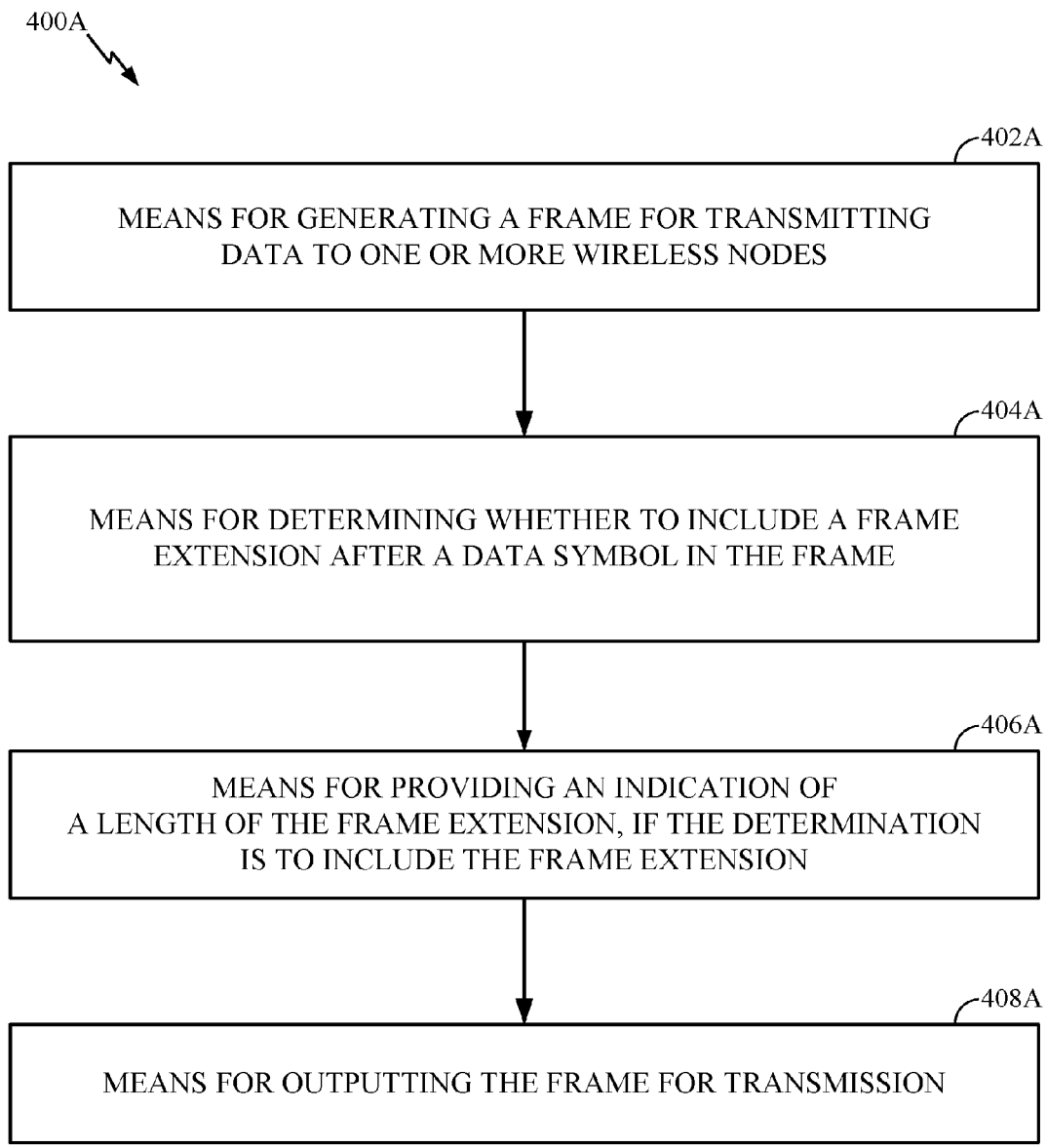
FIG. 4A illustrates example means capable of performing the operations set forth in FIG. 4.

FIG. 4 sets forth example operations 400 for wireless communications, in accordance with certain aspects of the present disclosure. The operations 400 may be performed by an apparatus, for example, an AP (e.g., AP 110 shown in FIGS. 1-2), to transmit frames including frame extensions as described above.

Operations 400 may begin at 402, by the apparatus generating a frame for transmitting data to one or more wireless nodes. At 404, the apparatus determines whether to include a frame extension after a data symbol in the frame. At 406, the apparatus provides an indication of a length of the frame extension, if the determination is to include the frame extension. At 406, the apparatus provides an indication of a length of the frame extension, if the determination is to include the frame extension. At 408, the apparatus outputs the frame for transmission.

Figure 5:
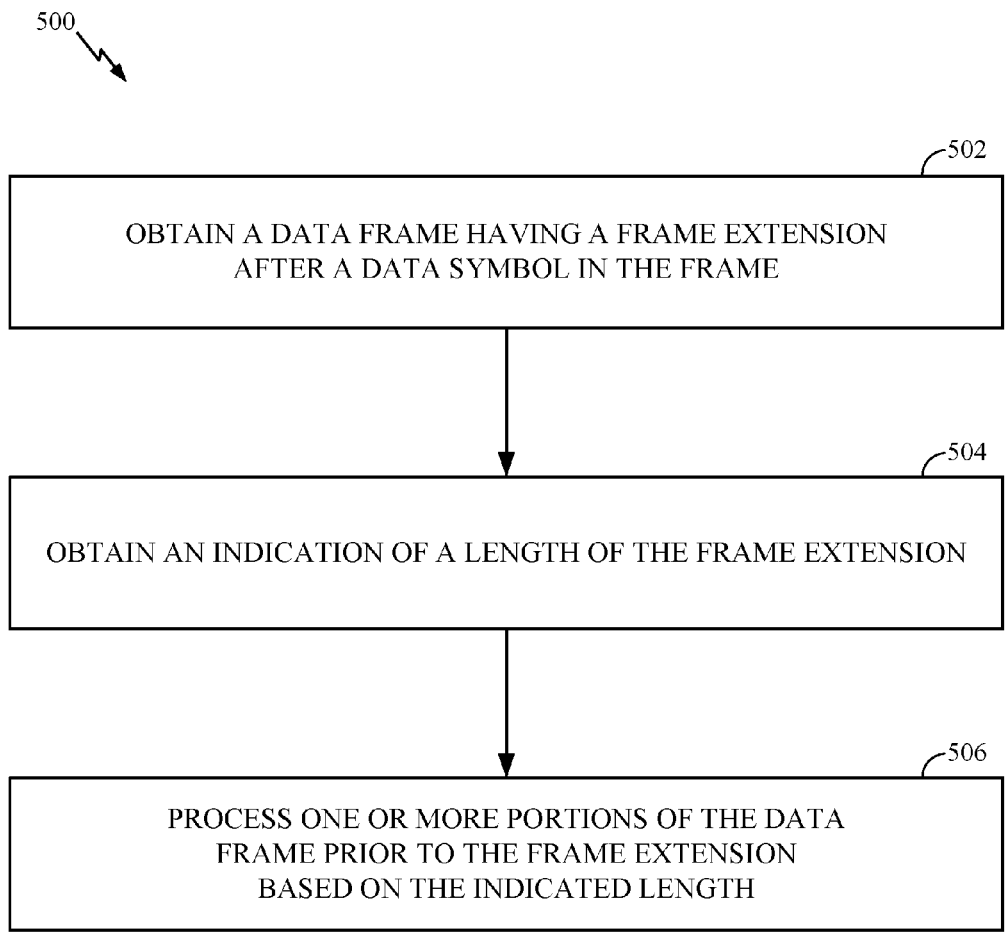
FIG. 5 sets forth example operations for wireless communications, in accordance with certain aspects of the present disclosure.
Figure 5A:
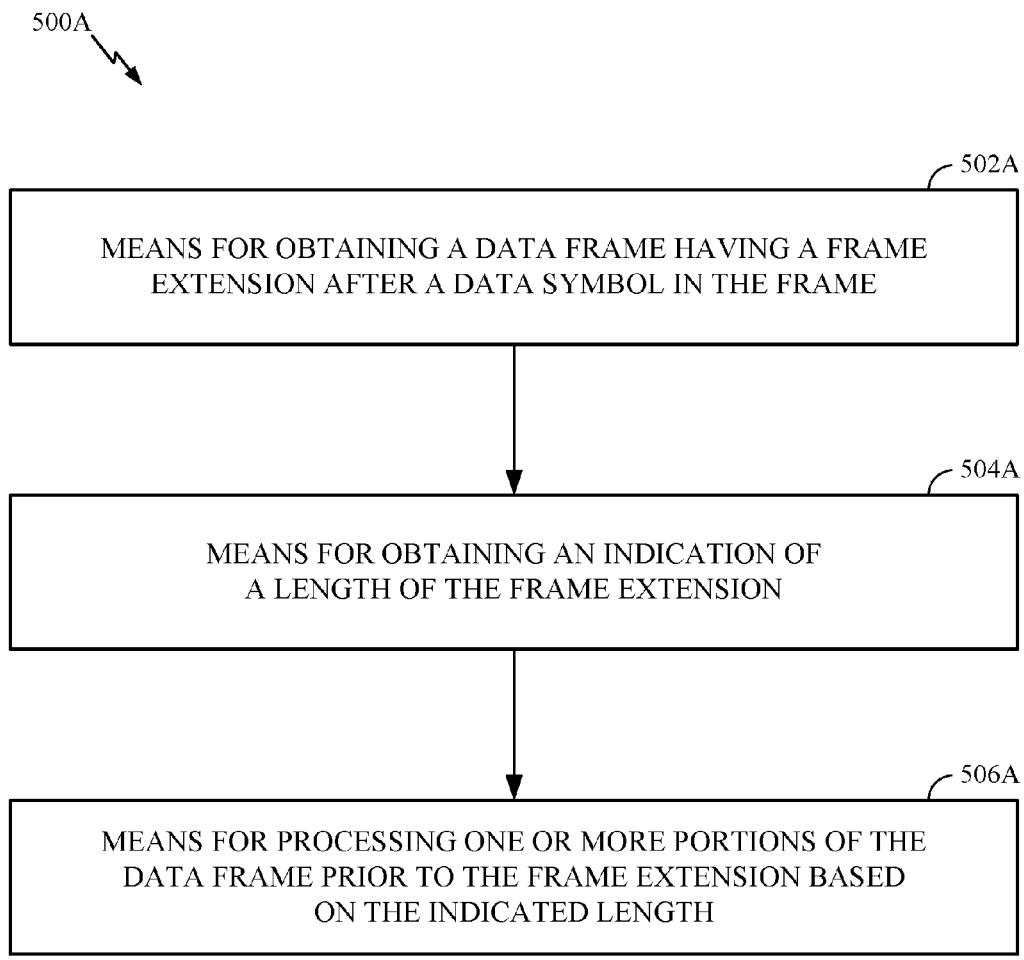
FIG. 5A illustrates example means capable of performing the operations set forth in FIG. 5.

FIG. 5 sets forth example operations 500 for wireless communications, in accordance with aspects of the present disclosure. The operations 500 may be performed by an apparatus, for example, a station (e.g., UTs 120a and 120m shown in FIGS. 1 and 2, respectively) and may be considered as complementary (STA-side) operations to operations 400.

Operations 500 may begin at 502, by the apparatus obtaining a data frame having a frame extension after a data symbol in the frame. At 504, the operation continues by the apparatus obtaining an indication of a length of the frame extension. At 506, the apparatus processes one or more portions of the data frame prior to the frame extension based on the indicated length.

The operations disclosed in association with FIGS. 4 and 5 may be performed by an AP and STA operating in a wireless network according to the IEEE 802.11ax standard, for example. According to aspects of the present disclosure, an AP may generate a frame for transmitting data, determine to transmit the frame with a frame extension based on the transmission bandwidth and transmission data rate of the frame, indicate to a STA a length of the frame extension (e.g., by setting bits within a field of the header of the frame), and then transmit the frame. The STA may receive the frame, obtain the indication of the frame extension length (e.g., by reading a field of the header of the frame), and process portions of the frame prior to the frame extension based on the indicated length. The STA may utilize the time used by the AP in transmitting the frame extension for the processing of the portions of the frame before the frame extension.

Figure 6:
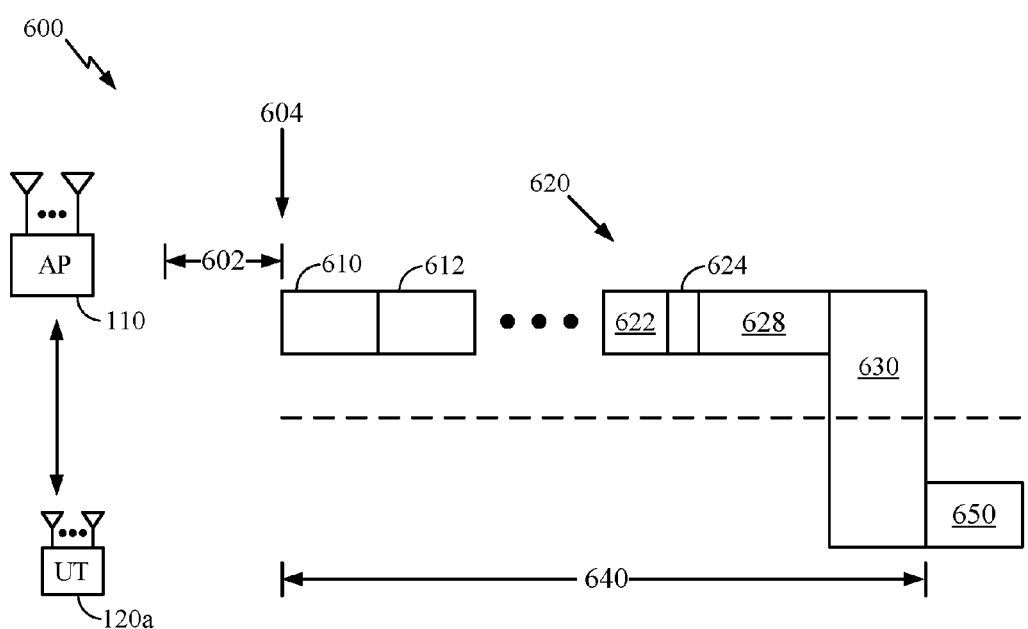
FIG. 6 illustrates an exemplary timeline of communications, according to aspects of the present disclosure.

FIG. 6 illustrates an exemplary timeline 600 of communications between an AP 110 and a STA 120a, according to aspects of the present disclosure. In the exemplary timeline, the AP may perform operation 400, while the STA may perform operation 500. During the time 602, the AP (e.g., one or more processors of the AP, such as controller 230, TX data processor 210, and TX spatial processor 220) may generate a frame for transmitting data to the STA, determine whether include a frame extension after a last data symbol of the frame, and provide an indication of a length of the frame extension. The AP may begin outputting the frame for transmission at 604. The frame may comprise a series of data symbols 610, 612, 620. The AP may include the indication of the length of the frame extension in the data symbol 610 or another data symbol. As described in more detail above, the last data symbol may comprise useful data 622 and padding 624. At 628, the AP may transmit a frame extension of the indicated length. At 630, the AP ends the transmission of the frame and a SIFS occurs. At time 604, the STA begins receiving and processing the data symbols of the frame. The STA may determine the length of the frame extension from the indication included by the AP. The STA may process the frame to obtain the data within the frame for the time period 640. At 650, after the end of the SIFS, the STA may begin transmitting, for example, an acknowledgment (ACK) of the frame.

Figure 7:
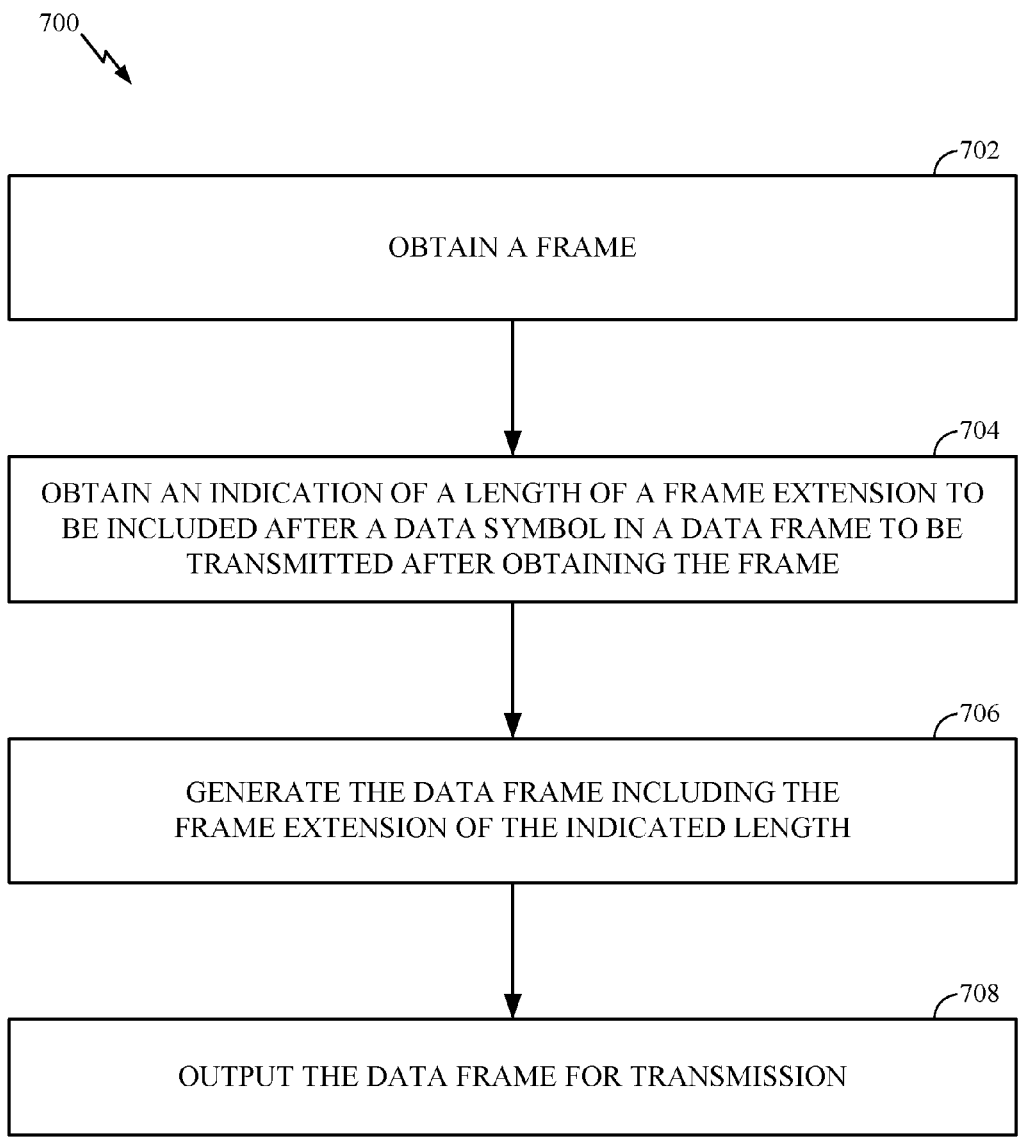
FIG. 7 sets forth example operations for wireless communications, in accordance with certain aspects of the present disclosure.
Figure 7A:
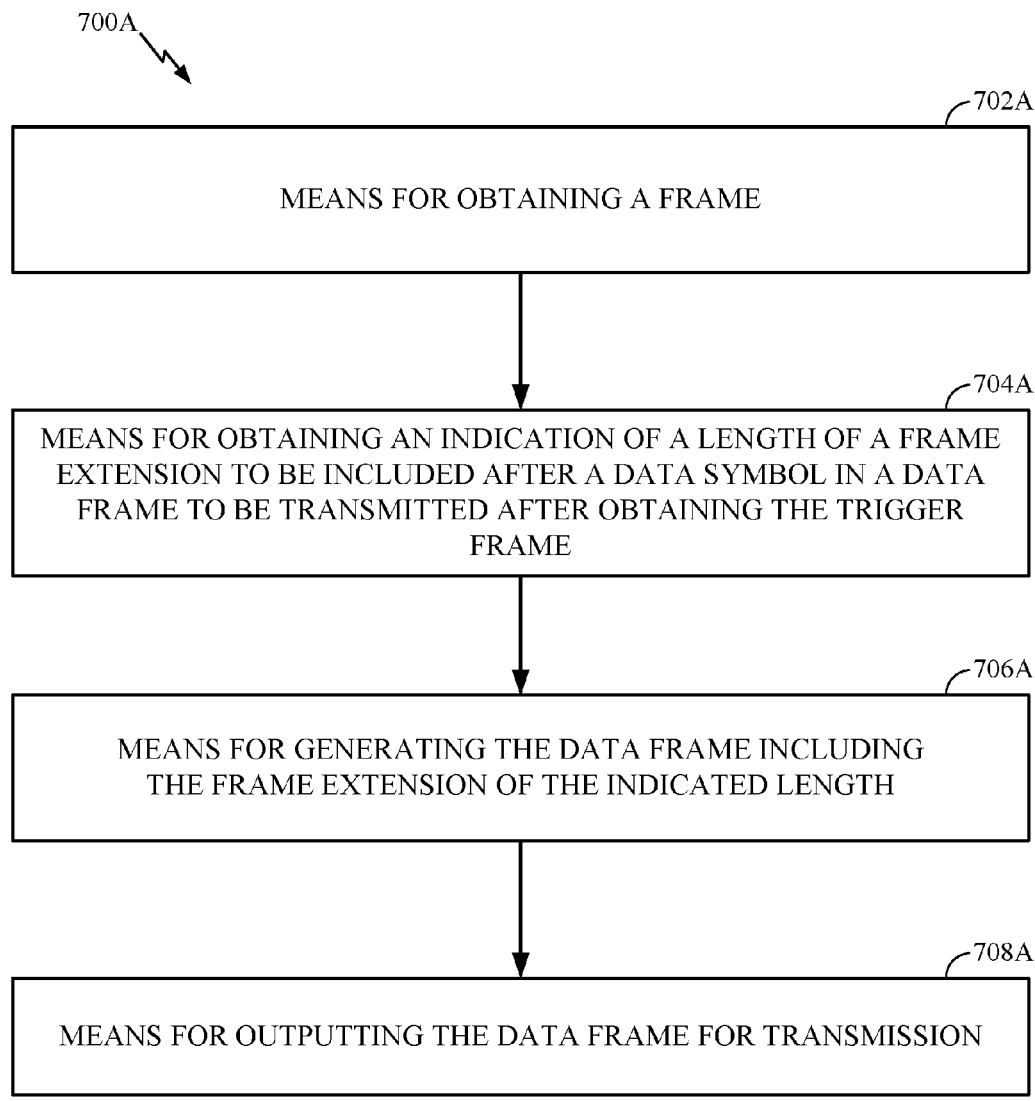
FIG. 7A illustrates example means capable of performing the operations set forth in FIG. 7.

FIG. 7 sets forth example operations 700 for wireless communications, in accordance with certain aspects of the present disclosure. The operations 700 may be performed by an apparatus, for example, a STA, to transmit frames including frame extensions as described above.

Operations 700 may begin at 702, by the apparatus obtaining a frame. At 704, the apparatus obtains an indication of a length of a frame extension to be included after a data symbol in a data frame to be transmitted after obtaining the frame. At 706, the apparatus generates the data frame including the frame extension of the indicated length. At 708, the apparatus outputs the data frame for transmission.

Figure 8:
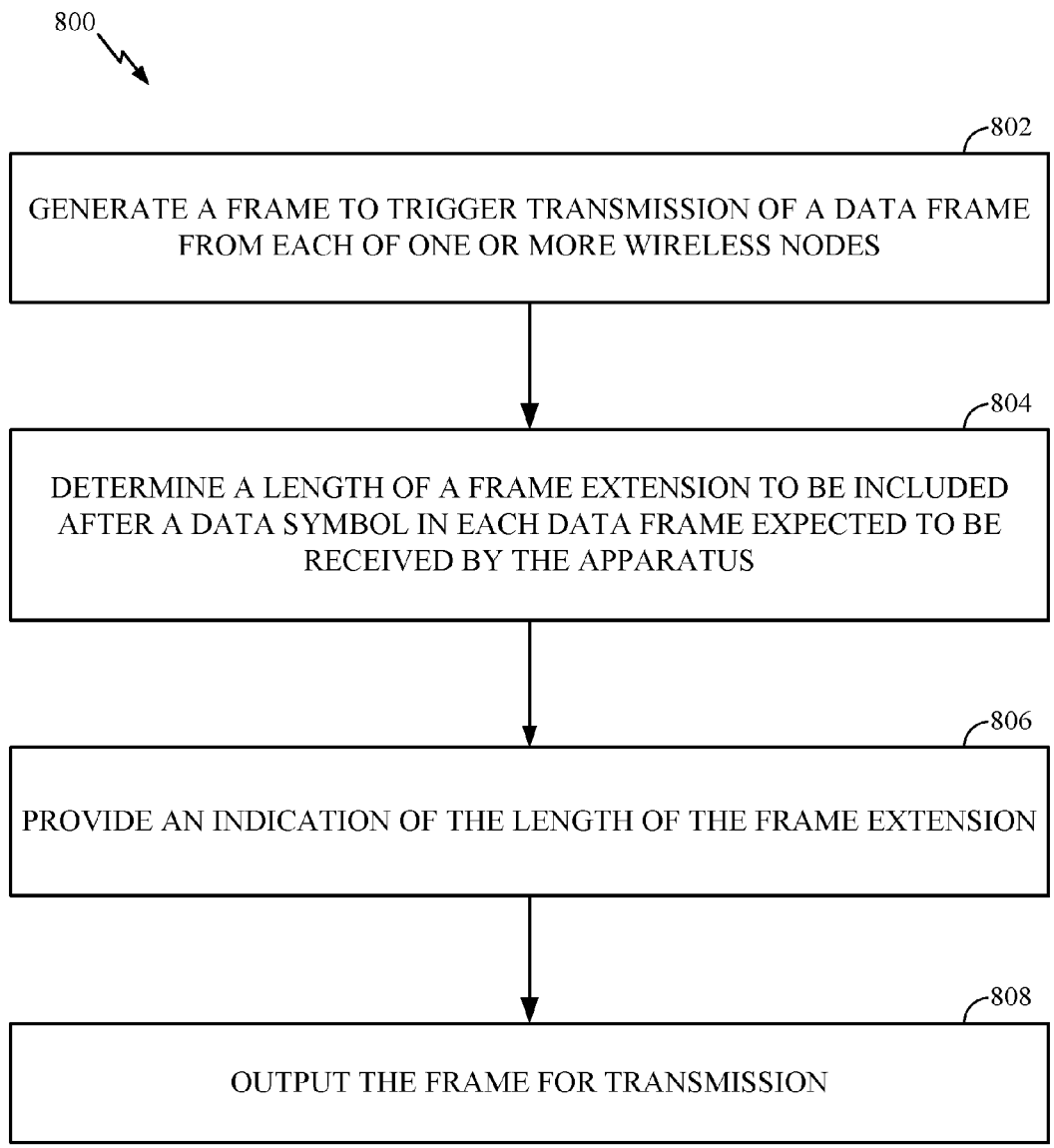
FIG. 8 sets forth example operations for wireless communications, in accordance with certain aspects of the present disclosure.
Figure 8A:
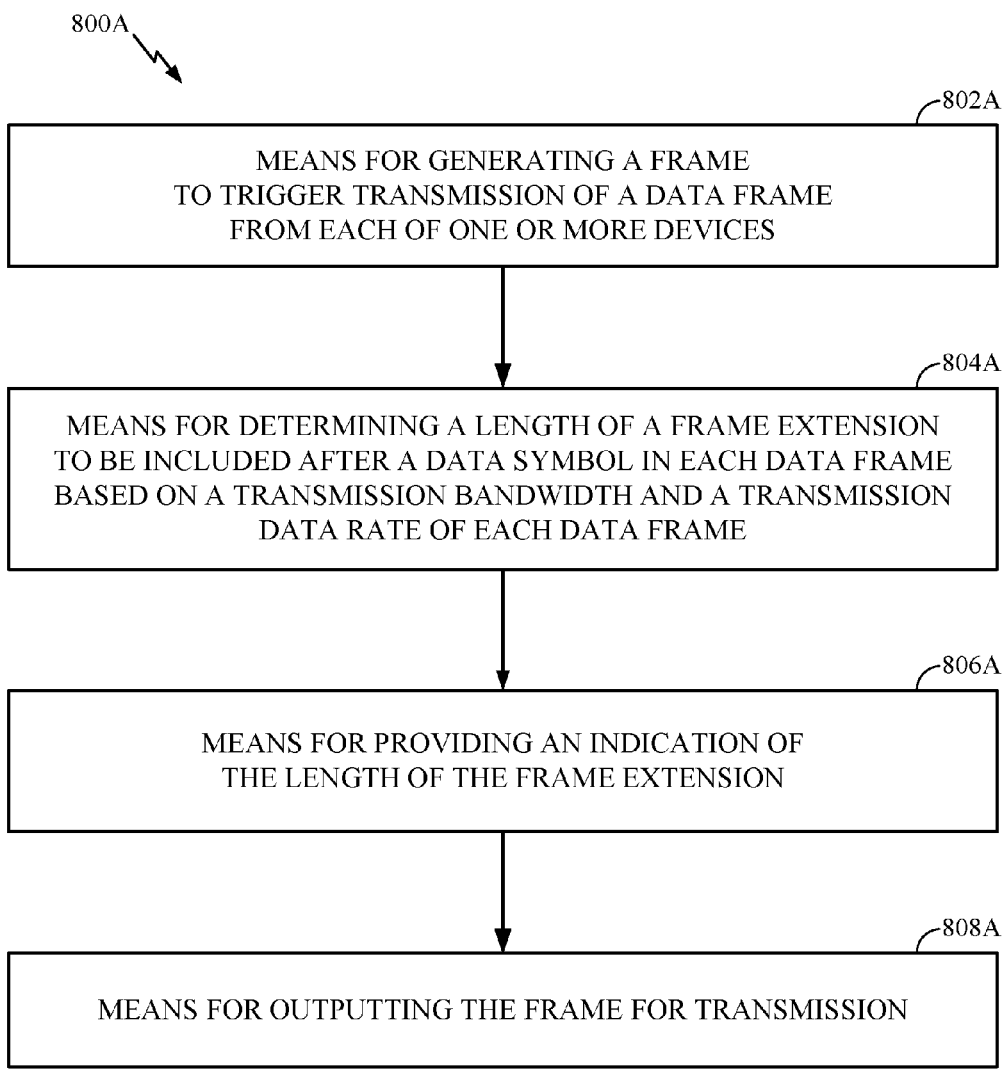
FIG. 8A illustrates example means capable of performing the operations set forth in FIG. 7.

FIG. 8 sets forth example operations 800 for wireless communications, in accordance with aspects of the present disclosure. The operations 800 may be performed by an apparatus, for example, an AP and may be considered as complementary (AP-side) operations to operations 700.

Operations 800 may begin at 802, by the apparatus generating a frame to trigger transmission of a data frame from each of one or more wireless nodes. At 804, the operation continues by the apparatus determining a length of a frame extension to be included after a last data symbol in each data frame expected to be received by the apparatus. At 806, the apparatus provides an indication of the length of the frame extension. At 808, the apparatus outputs the frame for transmission.

The operations disclosed in association with FIGS. 7 and 8 may be performed by one or more STAs and an AP operating in a wireless network according to the IEEE 802.11ax standard, for example. According to aspects of the present disclosure, an AP may generate a frame to trigger STAs to transmit data frames, determine a length of a frame extension to be included in each of the data frames based on the transmission bandwidth and transmission data rate of each data frame, indicate to the one or more STAs the length of the frame extension (e.g., by setting bits within a field of the frame), and then transmit the frame to the one or more STAs. The one or more STAs may each receive the frame, obtain the indication of the frame extension length (e.g., by reading a field of the frame), generate a data frame including the frame extension of the indicated length, and transmit the data frame. The AP and other devices receiving the frame may utilize the time used by each STA in transmitting the frame extension for processing portions of the data frames before the frame extensions.

Figure 9:
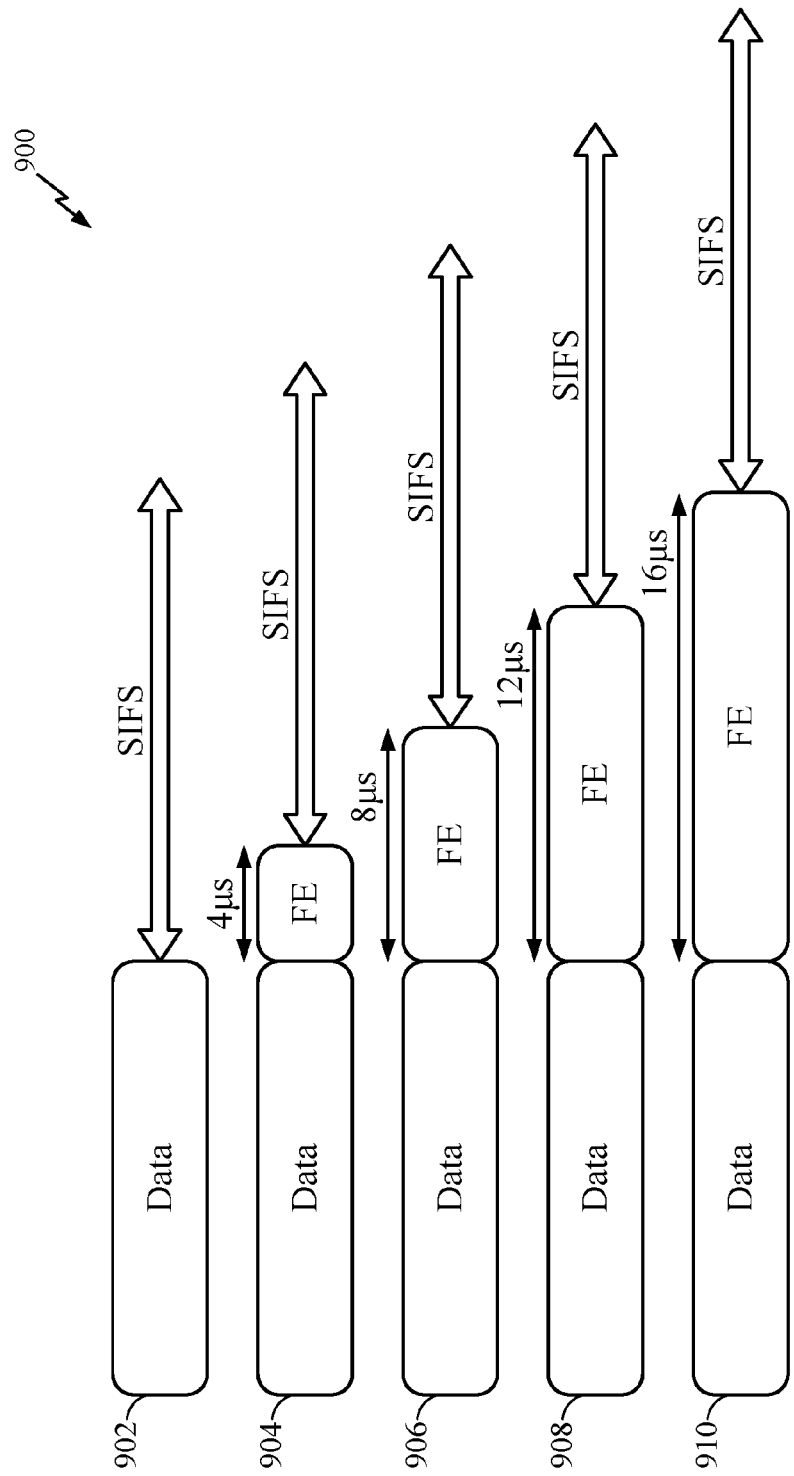
FIG. 9 illustrates exemplary timelines of data frames with frame extensions (FE), in accordance with certain aspects of the present disclosure.

FIG. 9 illustrates exemplary timelines 900 of data frames with frame extensions (FE), as described above. As described above, frame extensions may be added to the end of the frame, after the last data symbol, and extend the frame before the beginning of a SIFS. Timeline 902 illustrates an exemplary timeline of a data frame transmitted without a frame extension, as might be used for a low data rate transmission. Timelines 904, 906, 908, and 910 illustrate timelines with data frames including frames extensions of four, eight, twelve, and sixteen microseconds, respectively. As described above, the length of the frame extension selected may depend on the fraction of useful data in the final symbol of the frame.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400, 500, 700, and 800 illustrated in FIGS. 4, 5, 7, and 8 correspond to means 400A, 500A, 700A, and 800A illustrated in FIGS. 4A, 5A, 7A, and 8A, respectively.

For example, means for transmitting or means for providing may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving or means for obtaining may comprise a receiver (e.g., the receiver unit 222) and/or an antenna(s) 224 of the access point 110 illustrated in FIG. 2 or the receiver 312 and/or antenna(s) 316 depicted in FIG. 3. Means for generating, means for determining, means for providing, means for outputting, means for obtaining a frame, means for obtaining an indication, means for processing portions of a frame, means for obtaining, means for selecting may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3. Means for outputting may comprise one or more interfaces (e.g., interface 248, interface 292) between one or more processors and transmitters.

According to certain aspects, such means may be implemented by processing systems configured to perform the corresponding functions by implementing various algorithms (e.g., in hardware or by executing software instructions) described above for performing fast association. For example, means for identifying wakeup periods may be implemented by a processing system performing an algorithm that identifies wakeup periods based on a configuration (e.g., via an IE), means for determining whether to enable radio functions during wakeup periods may be implemented by a (same or different) processing system performing an algorithm that takes, as input, the wakeup periods and whether the presence of data has been indicated, while means for enabling radio functions may be implemented by a (same or different) processing system performing an algorithm that takes, as input, the decision from means for determining and generates signals to enable/disable the radio functions accordingly.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) for receiving structures processed by an RF front end (e.g., via a bus). Similarly, the term transmitter may refer to an RF transmitter of an RF front end or an interface (e.g., of a processor) for outputting structures to an RF front end for transmission (e.g., via a bus).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system.

By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
   a processing system configured to:
   generate a frame for transmitting data to one or more wireless nodes;
   determine whether to include a frame extension after a data symbol in the frame;
   determine a length of the frame extension, if the determination is to include the frame extension in the frame, based on an amount of data in the data symbol of the frame and on a ratio of useful coded data bits in the data symbol to total coded bits in the data symbol; and
   provide an indication of the length of the frame extension within the frame, if the determination is to include the frame extension;
   a first interface configured to output the frame for transmission.

2. The apparatus of claim 1, wherein the determination whether to include a frame extension is based on at least one of a transmission bandwidth or a transmission data rate for transmitting the frame.

3. The apparatus of claim 1, wherein:
   the indication is provided as one or more bits;
   different combinations of values of the one or more bits correspond to different quantized values of the ratio; and
   the different quantized values of the ratio correspond to different frame extension lengths.

4. The apparatus of claim 1, wherein the indication is provided via one or more bits in a signal field of the frame.

5. The apparatus of claim 1, wherein the determination is to include the frame extension if the transmission bandwidth is greater than or equal to a threshold value.

6. The apparatus of claim 1, wherein the determination is to include the frame extension if a transmission data rate for transmitting the frame is greater than or equal to a threshold value.

7. The apparatus of claim 6, wherein the processing system is further configured to determine a number of spatial streams to be used to transmit the frame and a transmission bandwidth to be used to transmit the frame, and wherein the threshold value is based on at least one of the transmission bandwidth or the number of spatial streams.

8. The apparatus of claim 6, wherein the processing system is further configured to determine a number of spatial streams to be used to transmit the frame, to determine a transmission bandwidth to be used to transmit the frame, to obtain a set of different threshold values corresponding to combinations of transmission bandwidths and numbers of spatial streams, and to select the threshold value from the set based on at least one of the determined number of spatial streams or the determined transmission bandwidth.

9. The apparatus of claim 1, wherein the processing system is further configured to determine a modulation and coding scheme (MCS) to be applied when transmitting the frame and wherein the determination of whether to include the frame extension is to include the frame extension if the MCS is higher than or equal to an MCS threshold.

10. The apparatus of claim 9, wherein the processing system is further configured to determine a number of spatial streams to be used to transmit the frame, to determine a transmission bandwidth to be used to transmit the frame, and to determine the MCS threshold based on at least one of the determined transmission bandwidth or the determined number of spatial streams.

11. The apparatus of claim 9, wherein the processing system is further configured to determine a number of spatial streams and a transmission bandwidth to be used to transmit the frame, to obtain a set of different MCS thresholds corresponding to different combinations of transmission bandwidths and numbers of spatial streams, and to select the MCS threshold from the set based on the determined number of spatial streams and the determined transmission bandwidth.

12. The apparatus of claim 6, wherein the threshold value is based on a reception capability of the one or more wireless nodes expected to receive the frame.

13. The apparatus of claim 1, wherein the processing system is further configured to determine the length of the frame extension based on a reception capability of the one or more wireless nodes expected to receive the frame.

14. The apparatus of claim 1, wherein:
the one or more wireless nodes comprise a plurality of wireless nodes;
the processing system is further configured to determine a frame extension length for each of the plurality of wireless nodes; and
the length of the frame extension included in the frame corresponds to a maximum value of the frame extension lengths determined for each of the plurality of wireless nodes.

15. An apparatus for wireless communication, comprising:
a processing system configured to:
generate a frame to trigger transmission of a data frame from each of one or more wireless nodes;
determine a length of a frame extension to be included after a data symbol in each data frame expected to be received by the apparatus based on an amount of data in the data symbol of each data frame and on a ratio of useful coded data bits in the data symbol of each data frame to total coded bits in the data symbol of each data frame; and
provide an indication of the length of the frame extension within the frame; and
a first interface configured to output the frame for transmission.

16. The apparatus of claim 15, wherein the length of the frame extension is based on at least one of a transmission bandwidth or a transmission data rate for transmitting the data frame.

17. The apparatus of claim 15, wherein the indication is provided via one or more bits in a signal field of the frame.

18. The apparatus of claim 15, wherein the processing system is further configured to determine the length of the frame extension for each data frame based on a reception capability of the apparatus.

19. The apparatus of claim 15, wherein:
the apparatus further comprises a second interface configured to obtain each of the data frames from the one or more wireless nodes; and
the processing system is further configured to process one or more portions of each data frame, prior to the frame extension of said each data frame, based on the indicated length.

20. The apparatus of claim 15, wherein:
the one or more wireless nodes comprise a plurality of wireless nodes;
the processing system is configured to determine a frame extension length for each of the plurality of wireless nodes; and
the length of the frame extension indicated in the frame corresponds to a maximum value of the frame extension lengths determined for the plurality of wireless nodes.

21. An apparatus for wireless communication, comprising:
an interface configured to obtain a data frame having a frame extension after a data symbol in the data frame and to obtain an indication of a length of the frame extension, wherein the length of the frame extension is based on an amount of data in the data symbol of the frame and on a ratio of useful coded data bits in the data symbol to total coded bits in the data symbol; and
a processing system configured to process one or more portions of the data frame prior to the frame extension based on the indicated length.

22. The apparatus of claim 21, wherein:
the indication is obtained as one or more bits; and
the processing system is configured to determine the length based on a mapping of different combinations of values of the one or more bits to different frame extension lengths.

23. The apparatus of claim 21, wherein the indication is obtained via one or more bits in a signal field of the data frame.

24. The apparatus of claim 21, wherein
the processing system is further configured to provide an indication of a reception capability of the apparatus, wherein the length of the frame extension is based on the reception capability.

25. An apparatus for wireless communication, comprising:
a first interface configured to obtain a frame and to obtain an indication of a length of a frame extension to be included after a data symbol in a data frame to be transmitted after obtaining the frame, wherein the length of the frame extension is based on an amount of data in the data symbol of the frame and on a ratio of useful coded data bits in the data symbol to total coded bits in the data symbol;
a processing system configured to generate the data frame including the frame extension of the indicated length; and
a second interface configured to output the data frame for transmission.

26. The apparatus of claim 25, wherein:
the indication is obtained as one or more bits; and
the processing system is configured to determine the length based on a mapping of different combinations of values of the one or more bits to different frame extension lengths.

27. The apparatus of claim 25, wherein the indication is obtained via one or more bits in a signal field of the frame.

* * * * *